July 8, 1952 — O. H. SCHMITT ET AL — 2,602,924
ANTENNA FIELD PATTERN MEASURING SYSTEM
Filed Oct. 23, 1947 — 6 Sheets-Sheet 1

MODEL FREQUENCY = ACTUAL FREQUENCY × $\frac{\text{ACTUAL WINGSPREAD}}{\text{MODEL WINGSPREAD}}$ INVENTORS
Otto H. Schmitt
Winfield E. Fromm
Wesley A. Fails
Roger E. Avery
Fredrik R. Barnes
BY Blair, Curtis + Hayward
ATTORNEYS

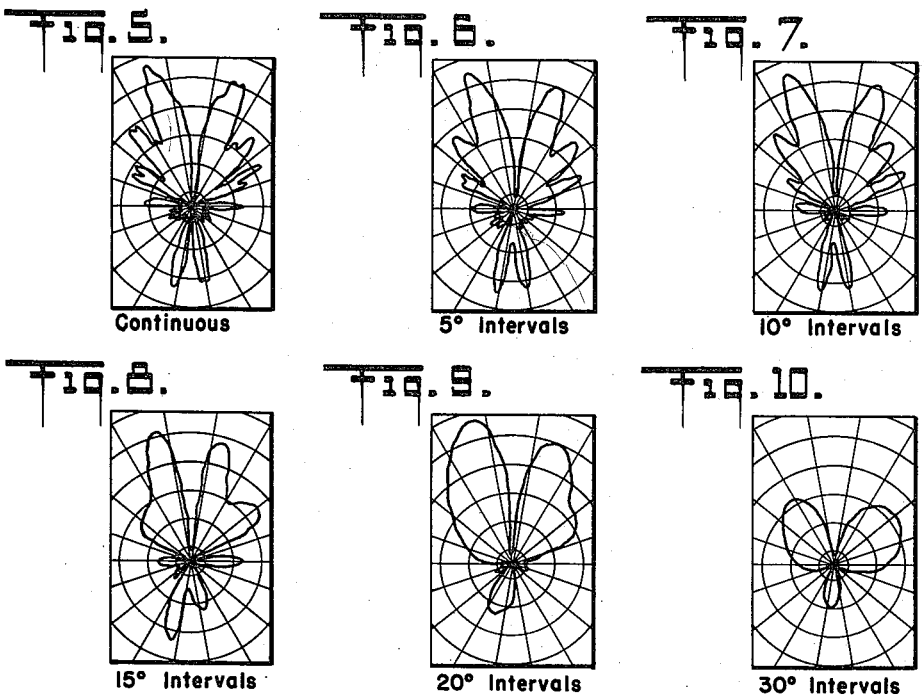
Fig. 5. Continuous
Fig. 6. 5° Intervals
Fig. 7. 10° Intervals
Fig. 8. 15° Intervals
Fig. 9. 20° Intervals
Fig. 10. 30° Intervals
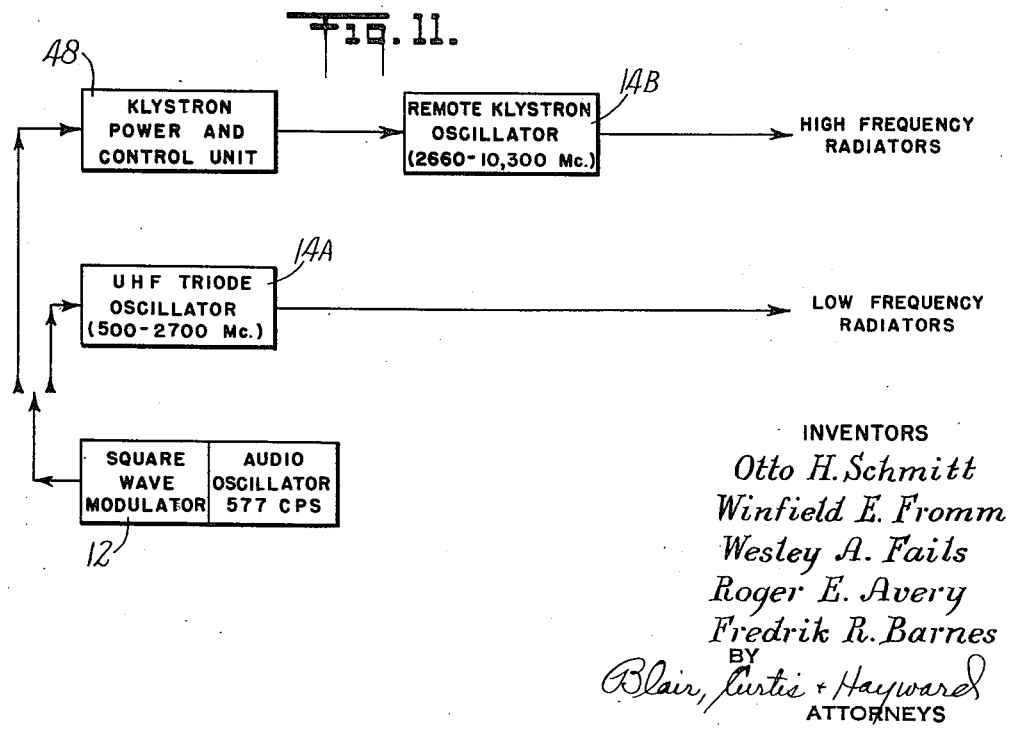
Fig. 11.
INVENTORS
Otto H. Schmitt
Winfield E. Fromm
Wesley A. Fails
Roger E. Avery
Fredrik R. Barnes
BY
Blair, Curtis + Hayward
ATTORNEYS

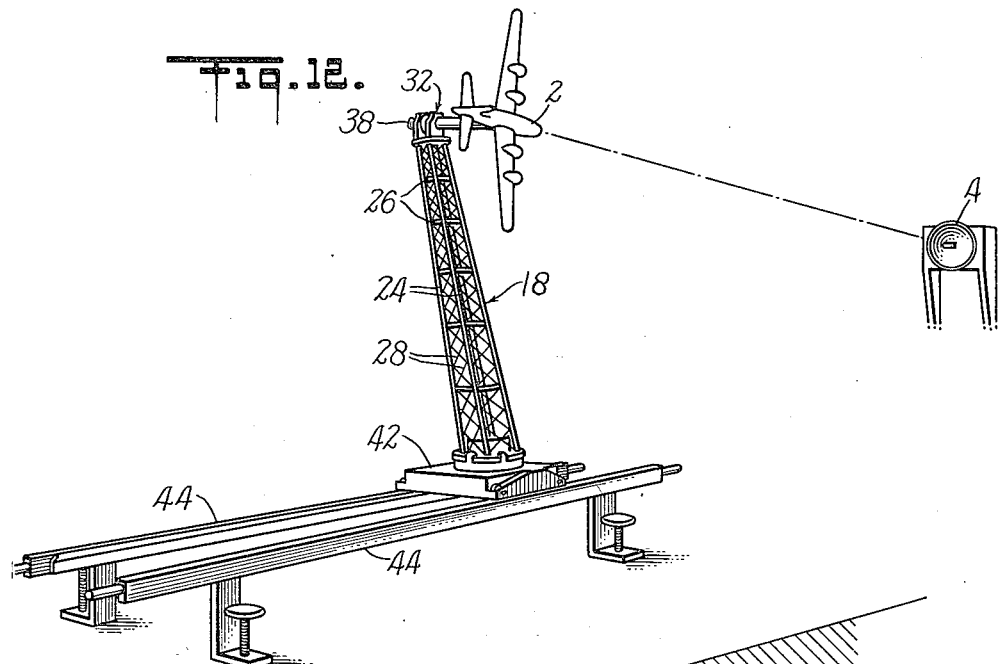
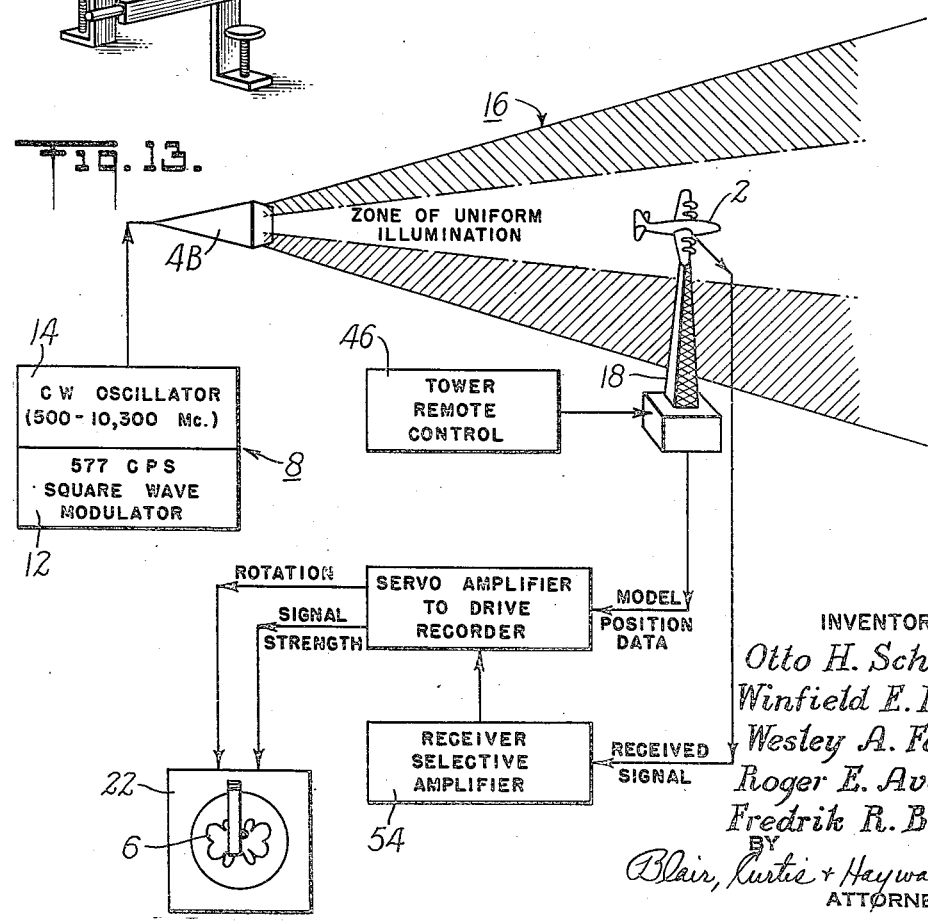

July 8, 1952  O. H. SCHMITT ET AL  2,602,924
ANTENNA FIELD PATTERN MEASURING SYSTEM
Filed Oct. 23, 1947  6 Sheets-Sheet 4
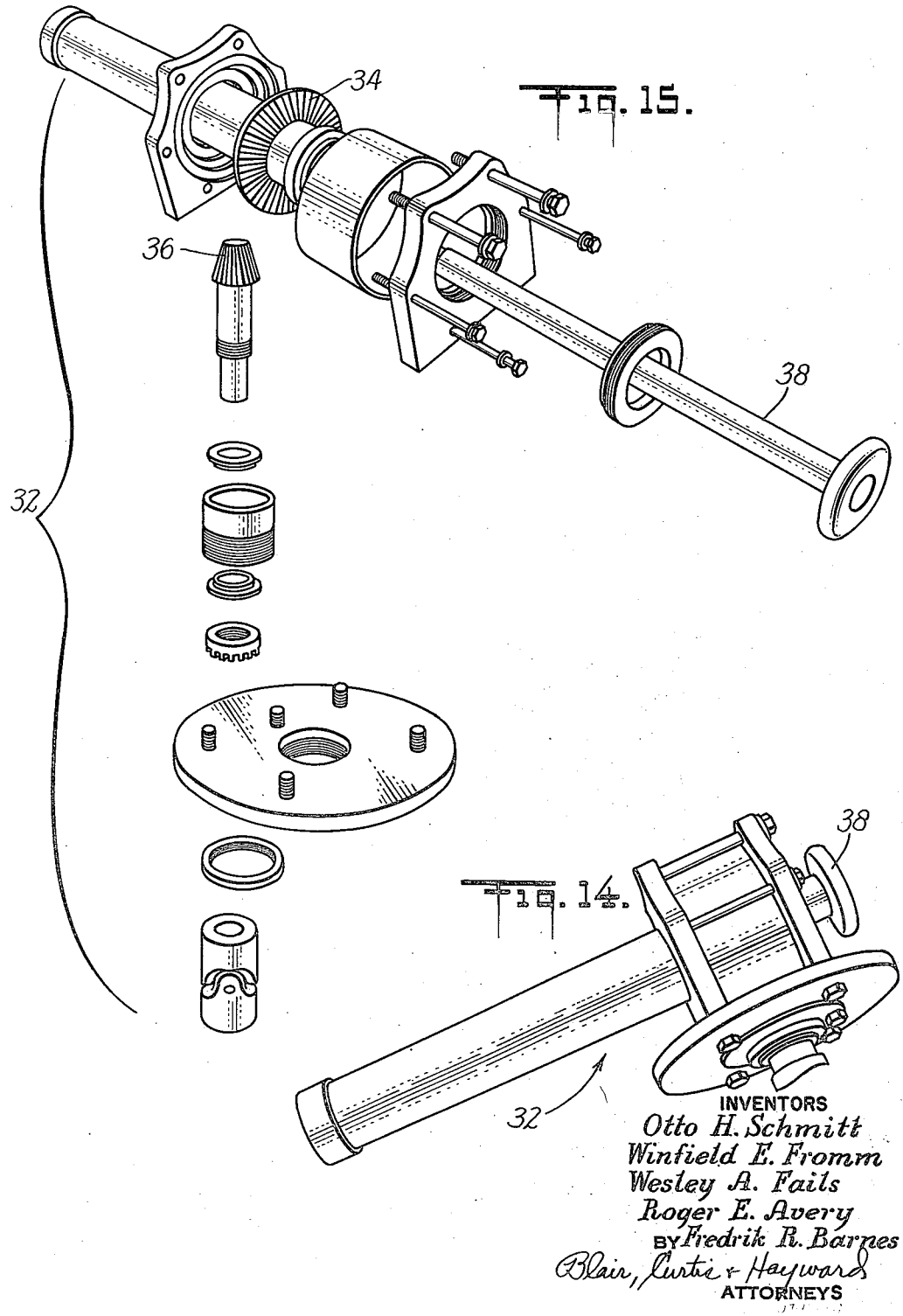
INVENTORS
Otto H. Schmitt
Winfield E. Fromm
Wesley A. Fails
Roger E. Avery
BY Fredrik R. Barnes
Blair, Curtis & Hayward
ATTORNEYS July 8, 1952     O. H. SCHMITT ET AL     2,602,924
ANTENNA FIELD PATTERN MEASURING SYSTEM
Filed Oct. 23, 1947     6 Sheets-Sheet 5
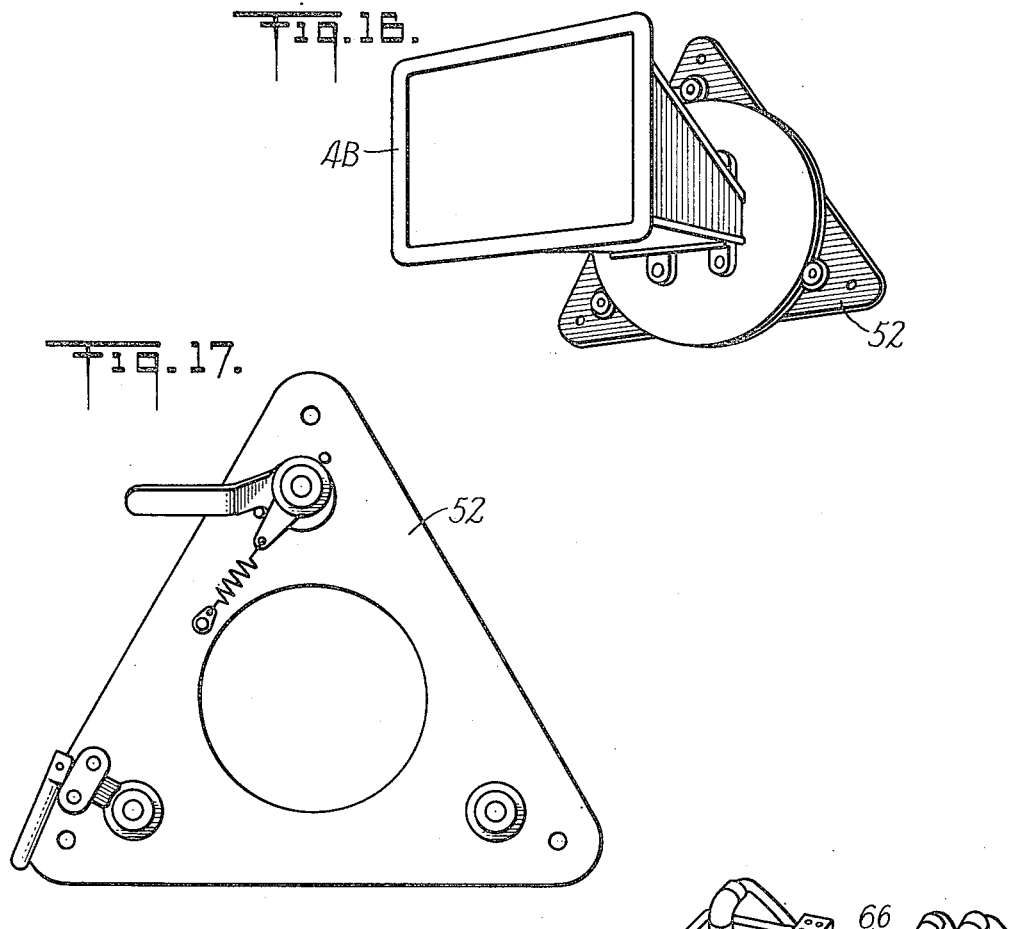
INVENTORS
Otto H. Schmitt
Winfield E. Fromm
Wesley A. Fails
Roger E. Avery
Fredrik R. Barnes
BY
Blair, Curtis + Hayward
ATTORNEYS

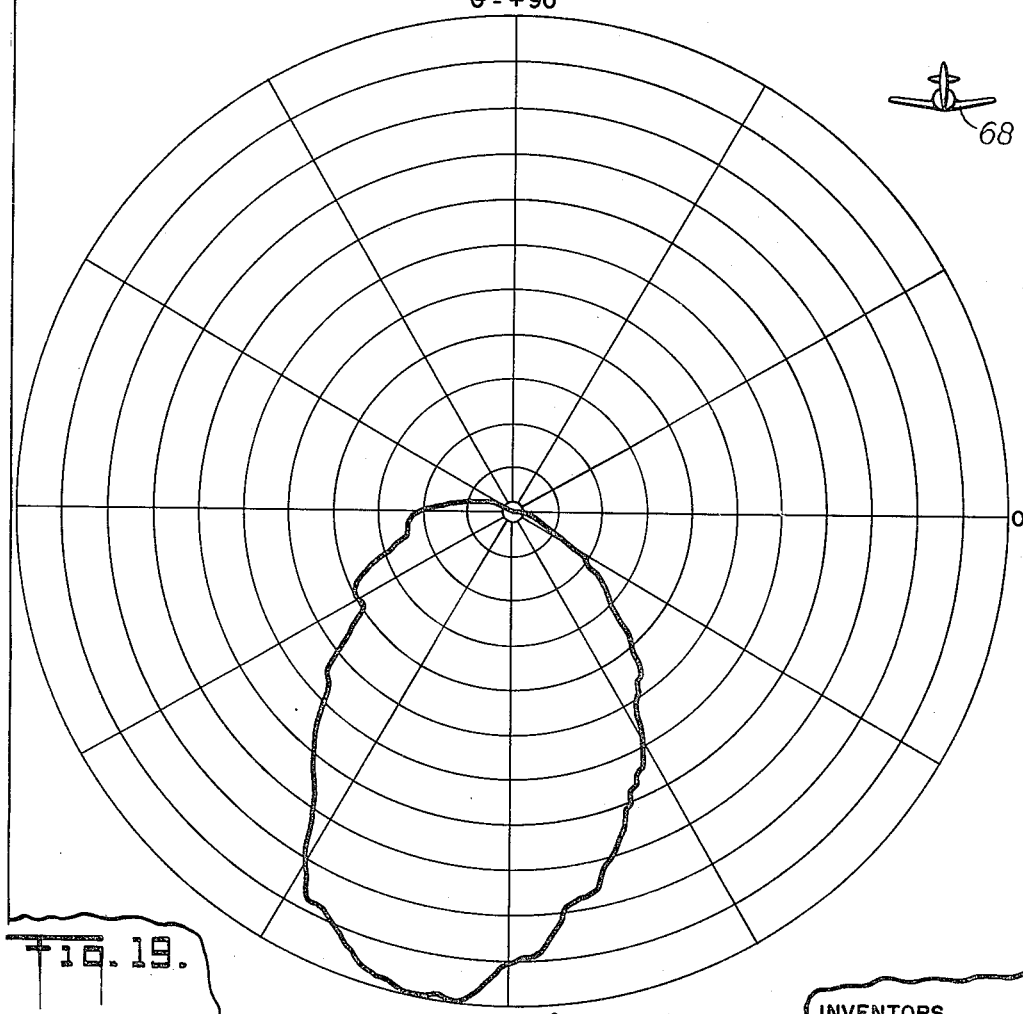

Patented July 8, 1952

2,602,924

UNITED STATES PATENT OFFICE 2,602,924

ANTENNA FIELD PATTERN MEASURING SYSTEM

Otto H. Schmitt, Minneapolis, Minn., and Winfield E. Fromm, East Williston, Wesley A. Fails, East Hempstead, Fredrik R. Barnes, Westbury, and Roger E. Avery, Oyster Bay, N. Y., assignors to Airborne Instruments Laboratory, Inc., Mineola, N. Y.

Application October 23, 1947, Serial No. 781,616

9 Claims. (Cl. 343—100)

This invention relates to apparatus for and methods of measuring the operating characteristics of antennas. More particularly it relates to apparatus and methods for the automatic and rapid production of accurate operational data of aircraft radio antennas, and for recording these data in a conveniently usable form at minimum expense.

Direct mathematical calculation of radiation characteristics is sometimes possible and may reveal the general character of the pattern which will be produced by a new or proposed antenna structure. Such calculations, however, are usually far from rigorous because the precise computation becomes virtually impossible unless many simplifying assumptions are made, particularly with respect to boundary conditions.

A skilled designer provided with such mathematical estimates, employing the concepts of optics where they are applicable, and aided by a great deal of practical experience in extrapolating from known cases, can often make a shrewd estimate of the performance of a new installation, but such designers are quick to recognize the fact that only by actual measurement can really reliable answers be obtained.

In the frequency ranges where airplane dimensions are comparable with radio wavelengths, it is particularly difficult to predict accurately the radiation pattern which a particular antenna installation will exhibit, because the entire airplane is actively a part of the antenna system.

However, many factors combine to render experimental measurements on aircraft antennas very difficult. For example, the antenna must be mounted on the particular type of aircraft with which it is to be used because the characteristics of the aircraft affect the operation of the antenna; the airplane must be aloft so that reflections from the earth will not interfere with the measurements; and in addition the problem is truly three dimensional and hence requires measurements over a full spherical shell.

Three approaches to the isolation problem are feasible: One employs tests on "live" airplanes, one makes use of real or mock-up planes mechanically maneuvered on a high platform, and the third is based on the method of models. In accordance with the present invention scale models are employed in a system which is accurate, compact, and relatively inexpensive, and which does not require the existence of an actual airplane before experimental measurements can be obtained. Moreover, it yields quickly, and in compact usable form, the large bulk of data required to describe a three dimensional antenna radiation pattern.

In this system models of the aircraft and antenna are constructed according to a predetermined scale reduction and a radio signal utilized for the test which is higher in frequency than the radio signal with which the full-size antenna actually will be used, so that the ratio of the wavelength of the test radio signal is related to the dimensions of the model airplane in the same manner as the wavelength of the actual operating radio signal is related to the dimensions of the full size airplane.

The idea of using scale models for antenna pattern measurements is not a recent development. It has been previously proposed both for airplane and for ordinary antenna measurements in various laboratories. Most of these attempts to construct such measuring systems have depended, however, on laborious point by point measurements. Either the model or the test antenna was moved systematically in some sort of coordinate system by hand or by remote control. Such a system is completely impractical because of the large amount of data required to represent the operating characteristics of a single antenna. These data must represent the strength of radiation which may be expected from the antenna in every direction, i. e. over a full spherical shell.

In order to picture clearly the amount of data involved in such patterns a suitable coordinate system for recording the measurements is described below and followed by an estimate of the actual minimum number of measurements required in a particular instance.

The airplane in flight is always small compared with the extent of the surrounding field of radio energy so that for the purposes of determining the direction of arrival of radio signals emanating from the aircraft, the aircraft may be considered as a point source. It is taken, accordingly, as the origin of a spherical polar coordinate system in which the two angles, $\theta$ and $\phi$, define the angles of elevation and azimuth, respectively, as seen from the pilot's position in the aircraft. The angle of elevation, $\theta$, is taken as zero in the plane of the horizon and is assigned positive values, from zero to 90 degrees, above the horizon and negative values, from zero to 90 degrees, below the horizon. The azimuthal angle $\phi$ is taken as zero in the forward direction of the airplane and increases clockwise through 360 degrees. These angles, as shown in Fig. 1, thus conform to conventional military usage for elevation and azimuth. For example, the direction P (Fig. 1) relative to the position of the aircraft can be expressed in terms of the angles $\theta$ and $\phi$.

Although it is possible to cover the polar sphere by any systematic variation of these two coordinates, two sets of these have been chosen for regular use. These we call "principal plane patterns" (as illustrated in Fig. 2) and "conical patterns" (as illustrated in Fig. 3).

There are three principal plane patterns, "horizontal" (A in Fig. 2), "longitudinal vertical," i. e. vertical fore-and-aft (B in Fig. 2), and "transverse vertical," i. e. vertical athwartship (C in Fig. 2). These three patterns, representing three mutually perpendicular plane sections of the sphere can be utilized to give quickly an approximate picture of the whole pattern.

Conical patterns are taken by changing the relative positions of the transmitter and receiver so that $\theta$, the elevation angle, assumes successive values, separated, for example, by 5 or 10 degrees, and $\phi$, the azimuth angle, rotates through 360° at each value of $\theta$. Typical positions of such conical patterns are shown at D, E, F, and G in Fig. 3.

A family of patterns will include, typically, a set of 19 conical patterns together with the three principal plane patterns. Because the horizontal principal plane is included among the conical patterns, a total of 21 plane polar coordinate graphs is required to represent the relative strength of the field radiated in the various directions by a particular antenna at a given frequency.

To emphasize the actual amount of data involved in these patterns, consider the number of individual readings required to specify a complete spherical antenna pattern. Fig. 5 shows an actual radiation pattern in a particular plane. From this pattern, point values have been taken around the circle at intervals, respectively of 5, 10, 15, 20, and 30 degrees and utilized for making the antenna pattern curves shown in Figs. 6 to 10, inclusive. These points were connected with smooth curves by a draftsman who was not permitted to see the original pattern. The results establish that even a 10 degree mesh of point readings is not sufficiently complete if the sharp peaks and nulls are to be apparent. However, assuming that such 10 degree intervals between measurements in each plane are adequate, and that similar angular spacing exists between the successive elevation angles at which readings are taken, about 500 readings are required to present the entire pattern.

In addition, however, two polarizations are required in order to permit calculation of absolute directivity, and for this reason the number of measurements is increased by a factor of two, i. e. 1000 readings are required to determine a single spherical pattern at one frequency. For wide band antennas this number is further multiplied by the number of frequencies at which the pattern must be repeated. As this number usually does not exceed ten for one antenna, it is apparent that between 1000 and 10,000 measurements are necessary in order to acquire complete pattern information for a single antenna on a particular aircraft.

Recognizing that this large quantity of data is an inherent characteristic of any adequate three dimensional pattern system, it is an object of this invention to provide apparatus and methods for obtaining these data quickly, automatically, and in a readily understandable form, with a minimum expenditure of technical manpower and time.

It is another object of this invention to provide in such a system, a tower for supporting test models and which has improved electrical and mechanical characteristics.

It is another object of this invention to provide apparatus and methods for controlling automatically and precisely the various movable components of such a system.

It is still another object to improve the operation of such a system by providing novel modulation methods and apparatus.

Still another object of this invention is to provide apparatus and methods for recording antenna field intensity patterns and overcoming ambiguities of conventional polarization concepts.

A further object of this invention is to provide such a system in which antenna patterns may be automatically and optionally recorded as a function of voltage or power of the received signal.

Another object is to provide improved radiators for producing a uniform field over a wide frequency range and in which the angular coverage of the field is to a large extent independent of frequency.

Still another object is to provide an improved mount for such radiators whereby the radiators may be quickly interchanged or rotated to a new position and which is optionally provided with an automatic positioning mechanism and/or a calibrated scale for denoting the angle of polarization of the radiated energy.

It is still another object to provide such a system having an extremely low noise level and high stability.

Still a further object is to provide an improved recorder for recording rapidly and automatically the field patterns.

Still another object is to provide an improved chart for representing graphically the field pattern and improved methods and apparatus for positioning and securing the chart to the recorder.

The invention, accordingly, consists in the features of construction, combinations of elements, arrangement of parts, and methods of operations as will be exemplified in the structures and sequences and series of steps to be hereinafter indicated and the scope of the application which will be set forth in the following claims.

Although, in accordance with the provisions of the statutes, there is illustrated and described the best form of the invention now known, it will be apparent to those skilled in the art that the system is complex and contains many interrelated components, each of which is subject to changes that can be made in the form of the apparatus disclosed without departing from the spirit of the invention as set forth in the appended claims, and that certain features of the invention may be at times used to advantage without a corresponding use of other features.

A better understanding of the invention will be had from a consideration of the following description of one embodiment of the invention taken in conjunction with the accompanying drawings in which:

Figs. 1, 2, and 3 illustrate one coordinate system for recording antenna pattern data;

Fig. 4 illustrates the operating range of a particular system;

Figs. 5, 6, 7, 8, 9, and 10 illustrate the accuracy obtainable with various plotting procedures;

Fig. 11 is a block diagram of certain components of the system;

Fig. 12 shows general arrangement of the radiating structure and the movable tower with a model airplane in position thereon;

Fig. 13 is another block diagram showing components of the system;

Fig. 14 is an enlarged perspective view of the tower head shown in Fig. 10;

Fig. 15 is an exploded view showing in perspective the various components of the tower head shown in Fig. 12;

Fig. 16 shows an electromagnetic radiator and the mounting arrangement therefor;

Fig. 17 is an enlarged view of the antenna mount shown in Fig. 16;

Fig. 18 is a perspective view of a polar recorder for recording automatically the field pattern; and Fig. 19 shows a chart with a typical field pattern recorded thereon.

Figure 4:
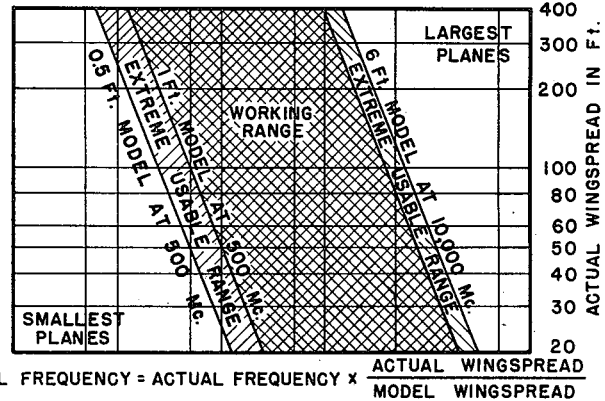

In accordance with the present invention, a scale model airplane 2 (Fig. 12) complete with a corresponding scale model antenna, and containing a rudimentary receiver, is rotated mechanically in a uniform radio field produced by a special parabolic electromagnetic radiator 4. A pattern 6 (Fig. 13) is produced by plotting the signal strength at the receiver in the model airplane 4 against the angular position of the airplane with respect to the source of the radio field, i. e. parabolic radiator 4 or horn type radiator 4B (Figs. 12 and 13).

The validity of this measuring method, in the case of a receiving antenna, is based directly on classical electromagnetic theory. Where a transmitting antenna is under test, its model is used also as a receiving antenna in accordance with the theorem of antenna reciprocity, which states that an antenna has the same radiation pattern whether used for reception or transmission.

A CW transmitter, generally indicated at 8 (Fig. 13) which includes a square wave modulator 12 operating at an audio rate, in this example 577 cycles per second, and a tunable oscillator 14, in this example, adjustable over the range from 500 to 10,300 megacycles, produces radio frequency energy at the required frequency which is selected in a manner to be described later. A highly directive antenna, for example, horn type radiator 4B powered with this energy produces a uniform beam of radiation, generally indicated at 16, advantageously several feet wide and a few feet above the ground.

The model airplane 2, complete with scale model antenna and rudimentary receiver, is mounted on a light non-metallic tower 18 in the uniform central part of the beam 16. The tower 18 is mechanically arranged to rotate the model in suitable coordinates to present all aspects of the model successively to the radiated beam. Electrical values which are a function of the tower and model positions as well as the received signal strength, are relayed back to an automatic recorder 22 (Figs. 13 and 18) to permit plotting of the received signal strength against angular position of the model plane 2 relative to the radiation source 4.

It is desirable that the models be small and light enough to permit convenient handling and storage. They are constructed ordinarily so that the wingspread does not exceed 6 feet as an extreme limit and usually do not exceed 4 feet in maximum dimension. The strength of the tower 18 may be readily made sufficient to permit the use of models weighing up to 35 pounds. The smallest models which can be used readily are between 6 inches and 1 foot in wingspread. These minimum dimensions are desirable because of the increasing delicacy of the model making work and particularly because of the necessity of keeping the plane large relative to its mounting fixtures, in order to minimize the effect of the adjacent dielectric structures.

The model 2, is constructed advantageously from light, easily worked wood, for example, sugar pine, spruce, or mahogany. For large models the interior is hollowed out to reduce the weight. The model, when shaped to the desired configuration, is coated with a conductive covering, for example, by flame-spraying successively with aluminum and copper to make the surface highly conductive yet easily solderable without excessive increase in weight.

A typical model may be made by a skilled model maker in about one working week and once made is usually tested with a variety of antennas, one antenna often being moved from place to place until a satisfactory location is found. Patches on the model may be made readily with sheet copper and solder.

Fig. 4 shows the frequency range in which measurements are made and the limits over which one particular system embodying the invention is designed to operate.

Because electrically conductive materials near the model airplane 2 would interfere with the measurements, the derrick portion of the tower 18 is constructed of selected dry spruce strips 24 with thin mahogany bulkheads 26 and is braced with tensioned lacings of fiber glass cord 28, the wood and lacing being impregnated with suitable plastic material. The glass cord 28 has elastic constants comparable with those of piano wire so that the resultant tower is exeremely rigid as well as light and non-reflective. Mechanical power is transferred to the tower head by a dielectric torque tube extending upwardly through the interior of the tower. In order to rotate the model, the tower 18 is provided with a tower head 32 (Figs. 14 and 15) which contains spiral bevel dielectric gears 34 and 36 and ball bearings of glass or other suitable material. A draw-in collet, which may be tightened by a control mechanism 38, permits rapid and secure attachment of models to the head.

The tower has three independent powered motions: (1) translation bodily along the trestle, (2) rotation about a vertical axis, and (3) rotation of the model about its mounting axis.

In order to rotate the airplane model 2 about itself as a center, rather than about the tower 18, the tower is tilted at an angle, for example, 15° from the vertical. This arrangement decreases the width of radio beam required, and at the same time keeps the tower 18 and tower head 32 somewhat out of the field.

The effect of the cable, which returns the signal from the model, on the radiated field probably constitutes the largest single source of error in the system. The effect of the signal cable on the pattern is generally small, and may be ascertained readily, in order to place the cable in the best possible position, by moving the cable to various positions and noting the effect on the recorded antenna pattern or on a suitable meter.

In order to eliminate the necessity for slip rings or similar arrangements and the difficulties attendant with their use, the continuous rotations of the tower and of the model about their respective axes are limited by stops and limit switches, for example, to something less than two revolutions.

In order to protect the tower when not in use, it is constructed so that it can be lifted from the trestle and rolled into a suitable weatherproof shelter by means of casters mounted in the bottom of the tower base 42.

All circuits to the tower are carried through a single 44 conductor cable, except for the signal return cable which is separate and is doubly shielded for better isolation. This signal cable extends downwardly on the side of the tower 18 away from the model and its slack is taken up by a spring-tensioned cable reel which thus prevents it from becoming tangled about the tower.

Provision to plug in a soldering iron or other 115 volt device, and a jack for connecting a hand telephone set for communication with the operating position are provided on the tower base 42, as is also a ruggedly encased remote output indicating meter which is useful in tuning the model.

Depending upon the location of the antenna under test the model airplane 2 may be mounted with either the under or the top side adjacent the tower, thus minimizing the effect of the mount by which the airplane is secured to the tower.

The motion of the tower 18 along the track 44 is useful in preliminary adjustment procedures. By causing the tower to "walk" across the beam of radiation 16, it is possible to determine the degree of uniformity of the beam, and to establish its exact center. If the tower is made to move parallel with the direction of the exciting radiation the existence of any standing waves due to reflections from surrounding objects is at once shown by periodic variations in the returned signal in contrast to the normal steady change with distance.

Figure 1:
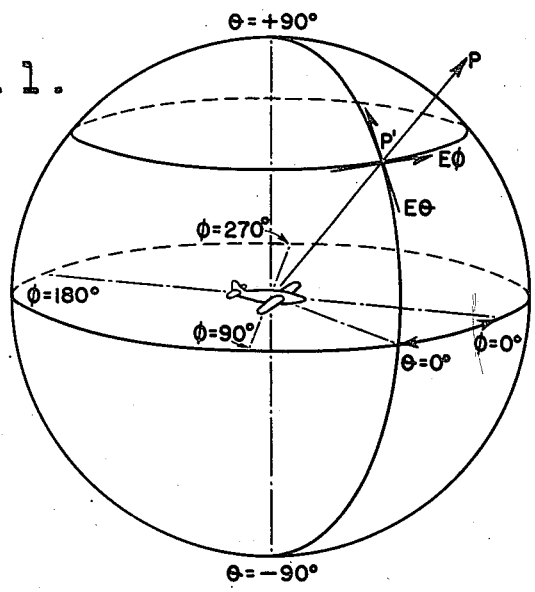

To avoid ambiguity, two new polarizations $E\phi$ and $E\theta$ have been defined. These replace the usual horizontal and vertical polarization concepts, respectively, but are identical with them at low elevation angles and are not ambiguous at high angles. $E\phi$ is defined as the polarization in which the electric vector is along the direction of changing $\phi$ (Fig. 1). Similarly, $E\theta$ has its electric vector along the direction of changing $\theta$. These two polarizations are orthogonal, and are always perpendicular to the direction of arrival of radiation.

The actual tower used for measurement is linked to the coordinate system described above. The model airplane is always mounted on the tower, as shown in Fig. 12, with its normally vertical axis in a horizontal plane.

Figure 2:
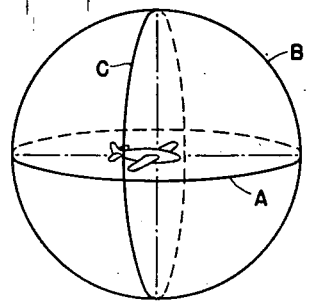

To produce the first of the principal plane patterns, i. e. the horizontal plane pattern A (Fig. 2), the axis of rotation of the model 2 is set perpendicular to the direction of propagation of the incident beam 16 and the model rotated about its mounting axis.

By rotating the model about its mounting axis until the plane is heading directly into the incident radiation 16 and then causing the tower 18 to rotate on its vertical axis, the longitudinal vertical pattern B is produced.

Similarly, by setting the model so as to head vertically either up or down and then rotating the tower about its vertical axis, the transverse vertical pattern C is obtained.

Figure 3:
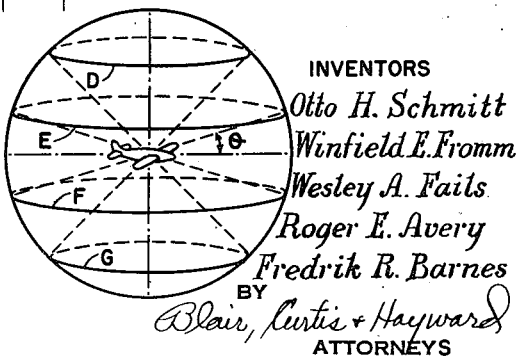

A member of the conical family of patterns (Fig. 3) is produced whenever the model is rotated about its mounting axis. The elevation angle for any one of these patterns is determined by the angular position of the tower head with respect to an imaginary line extending between the model 2 and the source of the radiation 4. If the top of the plane is directly toward the radiation source, the positive 90 degree elevation conical pattern is produced. If the tower head is pointed 45 degrees away from the radiation source, the positive 45 degree elevation conical pattern is produced, etc.

Each of the three tower motions is actuated by a separate D.-C. servomotor system under control of a single electronic system (indicated by block 46 in Fig. 13) which permits operation of any of the drives over a speed range of 100:1 or more. Speed and direction of motion are selected on a conveniently accessible control panel, and exact position of the tower in any of its three motions is indicated continuously by accurate remote synchro indicators which preferably are directly calibrated.

All primary A.-C. power is drawn from a suitably regulated A.-C. voltage which is followed in all D.-C. circuits by electronic regulators to give a high degree of stability.

In order to cover continuously an extremely wide frequency range, for example, from 500 to 10,300 megacycles two separate transmitting oscillators 14A and 14B (Fig. 11) are used, each with its own power supply. They are each modulated by modulator 12, which in all cases provides for square-wave modulation with, for example, 50% duty cycle at a precisely controlled frequency, in this case 577 cycles per second has been selected. The stability of this modulator frequency must be good, as will be evident when considering the receiver design.

The lower frequency transmitter 14A which is used, for example, in the range 500–2700 megacycles utilizes a 2C39 oilcan triode in a grid separation coaxial cavity oscillator circuit. The wide tuning range is achieved by utilizing $$\frac{\lambda}{4} \text{ and } \frac{3\lambda}{4}$$

modes of oscillation. Approximate tuning may be accomplished quickly by means of prepared tuning charts specifying values of cathode, plate, and coupling adjustment, thus, the frequency may be changed and favorable conditions selected with little loss of time. Final tuning is, of course, accomplished with the use of a suitably standardized wavemeter. Transmitter 14A produces ample energy, for example, two to 50 watts, and usually must be operated below maximum power output to prevent excessive field strength at the model.

The klystron transmitter 14B, which overlaps the above range and covers, for example from 2660 to 10,300 megacycles, uses very precisely regulated power supplies (48 in Fig. 11) for reflector, grid, and accelerator voltages. These supplies and their controls are housed in the transmitter rack at the operating position but the klystron itself is mounted in a small remote unit containing only the klystron, its blower, its R.-F. impedance matching transformer and necessary safety devices. In this way the klystron can be located close to the transmitting radiator 4 and connected to it by a few inches of coaxial cable, but can still be controlled from the transmitter once it is tuned. A power output indicator, actuated from a crystal probe in the klystron output lead, provides an output power indication both at the transmitter and at the klystron for use in tuning.

In the present example, five reflex klystrons, for example, of the 2K type, are required to cover the entire band and these are mounted permanently in plug-in units which can be slipped individually into the remote unit. Each of these klystrons has a total tuning range of about 30% but may be damaged by repeated wide range tuning; therefore, the klystrons are arranged to overlap in frequency so that the required tuning range of each klystron is restricted. Storage space for 8 klystron plug-in units is provided in the main tuner rack.

Advantageously, the field strength is monitored by a crystal probe and is continuously recorded by means of a suitable recording milliammeter.

It is desirable, for this work, to have a beam of radiation the angular width of which remains constant and which is just sufficiently wide to illuminate the model uniformly but not wide enough that excessive energy strikes nearby floors or other objects. It is typical of highly directional broad-band radiators, however, that their beam widths become narrower as the frequency increases.

In accordance with the present invention, a family of 5 radiators are provided, each covering about one octave, which give nearly uniform angular coverage of 5°–7° in their ranges, in both H and E planes, and have very little cross-polarization. The two radiators 4 for the lower frequency ranges, for example 500 to 1000, 1000 to 1800, and 1750 to 3150 megacycles use parabolas with defocused wideband exciters. Two interchangeable exciters permit double use of a 72 inch parabola while a 24 inch parabola has a fixed exciter.

Two pyramidal horns 4B are provided to cover the ranges 3100 to 5700 and 5650 to 10,300 megacycles. Each of these radiators is fed by a tapered-ridge waveguide exciter which maintains about 2:1 SWR over the octave to a 50 ohm line. The horn patterns are improved by dielectric correctors placed at the mouth of the horn.

Each of the radiators is adapted to fit into a mount 52 (Figs. 16 and 17) which is constructed so that they can be readily interchanged in a few moments. The antenna mount 52 is fitted with ball bearings and advantageously with a circular indexing plate so that the antenna may be quickly rotated to provide either $E\phi$ or $E\theta$ polarization. Preferably automatic stops are provided which make it unnecessary to realign the radiators after initial installation. Cross polarization for these antennas averages about 3% so that they may be regarded as good sources of plane polarized radiation.

The portion of the receiving system actually contained in the airplane model consists primarily of an R.-F. impedance matching system which may be of the single or double stub sort and a bolometer which serves as a load. The stubs are tuned by means of a detachable tuning tool which reaches into the interior of the plane. The bolometer may be either a specially designed Wollaston wire unit, such as that designed by Sperry, or it may be a common instrument Littlefuse, for example of 5 or 10 milliampere rating. The bolometer is constantly heated by D.-C. to a temperature not far below burnout. When modulated radio frequency energy is applied to the fuse, its wire heats and cools in response to changes in the power level, and consequently its resistance changes. Such changes in resistance in a circuit carrying current is equivalent to an audio frequency voltage input at modulation frequency. This audio signal is led by a doubly shielded cable to a high gain audio amplifier 54 (Fig. 13) located in the receiver rack.

At the higher frequencies, it is necessary to operate at very low levels of radio frequency power because of the limited power output of the klystron transmitter 14B, for example, .25–1 watt; amplifier 54, therefore, must have very high gain, 154 db in this example, and a correspondingly low noise level. In order to reduce the noise level the amplifier 54 is sharply tuned and may have, advantageously, a bandwidth at 577 cycles of the order of 4 cycles per second. This permits relatively rapid response with an equivalent background audio noise level, at the bolometer, of $\frac{1}{50}$ of a microvolt or less which is barely above resistance noise level.

It will be remembered that the change in bolometer resistance is brought about in response to temperature change which in turn is proportional to power input, rather than voltage. This is advantageous, if it is desired to record patterns in terms of power, because the bolometer amplifier yields this information automatically.

However, if it is desired that the recorder output be in terms of antenna voltage instead of power, it is necessary to plot the square root of the received signal. The extraction of this square root is accomplished in a special square root section of the amplifier 54 through introduction of non-linear feedback.

The square root section of the amplifier has a gain of about 1 for mid-scale signals but has greater gain for small signals and lesser gain for large, adjusted in non-linearity within 2% of square root over a power range of 1000 to one. The square root amplifier can be switched in or out of the circuit as desired.

The entire high gain amplifier and the bolometer are fed with rectified power from a single well-regulated power pack. In order to further increase the stability and reduce the possibility of oscillation, which might be occasioned by the high gain and the use of sharply tuned bank-pass circuits, a very low power supply impedance, e. g. about 5 ohms, is employed together with good decoupling and shielding. Alternating current may be used throughout for heating the filaments.

It might be expected that preamplification would be used in preferance to operating a cable approximately 100 feet long at audio signal levels below 1 volt, yet this has proved unnecessary. Output of the high gain amplifier is rectified and fed as D.-C. to the recorder.

The recorder 22 (Fig. 18) permits easy plotting of any ordinary A.-C. or D.-C. voltage as a radial distance against angles given by "synchro" or selsyn data. Since it is desirable to have angles accurately represented within a fraction of a degree, turntable 56 derives its motive power from a separate servomotor (rather than directly from selsyns) governed, in turn, by a control transformer type "synchro." There is, in fact, a double system of control available whereby a sensitive relay switches from one-to-one, to 36-to-one synchro operation for vernier positioning of the turntable. Angular accuracy is thus preserved to 0.25 degree or better. Switching equipment connects the turntable servo to any one of the tower axes chosen.

A recording pen 58, driven by a second servomotor of exceptionally low inertia, writes on the polar charts in accordance with the signal from the high gain amplifier. The accuracy of the radial trace is assured since the tone position is controlled by a precision potentiometer follow-up system equipped with rate circuits to assure high speed deadbeat operation.

In order to permit fast paper loading, the pen arm 62 can be lifted like a phonograph pickup arm and a sheet of paper or chart form 64 inserted or removed.

It is always difficult to mount coordinate paper accurately in a specified position on a platen since paper shrinks and swells and is seldom accurately dimensioned or punched. In accordance with the present invention, this mounting is accomplished by providing a pinhole at the exact center of the turntable 56 through which light shines. This light spot is set in the center of the bull's-eye on the paper 64 and a scribed radial line on the turntable surface is made to coincide with the zero axis of the polar paper. The paper or chart 64 is clipped to the steel turntable surface by small Alnico rosette magnets 66 thus permitting easy use of any size polar paper up to eleven inches in diameter. At it may be desired to record two polarizations or other distinct patterns on one sheet, additional pens 58 are provided which may be dropped into place in a moment. By the use of various colors of ink, the resulting curves can be distinguished easily.

For making aircraft antenna patterns, specially arranged polar graph sheets printed on tracing paper, so that copies can be produced in quantity either by photographic or blueprinting processes, are convenient. The forms, for example, as shown in Fig. 19, may advantageously carry blocks for recording pertinent data.

Each record pattern is rubber-stamped with a small view of an airplane as at 68, to show the plane in which the pattern was taken, and to reveal at a glance the orientation of the pattern with respect to the airplane.

It is obvious that, although the components, and combinations of the various components, as well as the entire system described herein have been described particularly as related to the measurement of antenna field patterns, separately and in combination they are adapted to have wide utility for many purposes and it is not intended that they be limited to the ultimate functions described herein.

We claim:

1. The method of determining directional radiation or reception characteristics of a translating device including the steps of rotating a first translation device to be tested about a first axis and a second axis perpendicular thereto, successively moving said second axis into a plurality of positions, transmitting an energy containing beam between said first translating device and a second translating device, measuring the energy received by the one of said translating devices utilized as a receiver, and continuously and automatically recording said measurement as a function of the relative instantaneous angle between said translating devices.

2. The method of determining directional radiation characteristics of an antenna including the steps of producing a directed beam of radio frequency energy having at least one transverse area of substantially constant field intensity, rotating within said area the antenna which is to be tested, and measuring the magnitude of the signal received by said antenna as a function of an instantaneous angle of said antenna relative to a predetermined reference point.

3. The method as defined in claim 2 comprising, the additional step of regularly decreasing and increasing the intensity of said radio frequency field, at rapid, successive, intervals.

4. The method as defined in claim 2 including, the additional step of successively turning said field off and on at rapidly recurrent regular intervals.

5. The method as defined in claim 2 comprising the additional steps of modulating said radio frequency field, and detecting the signal received by said antenna at a physical location proximate said antenna and by a detector rotating therewith.

6. The method of determining the field pattern of an aircraft antenna when mounted on a particular type of aircraft, in which a scaler model of the aircraft and antenna is utilized in the measurements, said method comprising the steps of: rotating said model about a predetermined axis; radiating a beam of electromagnetic energy having a wavelength related to the wavelength at which said antenna is to be used by the same ratio by which the physical dimensions of said model are related to the physical dimensions of said aircraft; synchronizing the rotation of a chart with the rotation of said model; and recording automatically thereon a polar plot representing the relative strength of the signal received by said model antenna as a function of the angle of said model relative to the direction of propagation of said electromagnetic beam.

7. The method of determining directional radiation characteristics of an antenna including the steps of producing a radio frequency signal, modulating said signal with a modulation signal of constant frequency, radiating the resulting modulated signal, producing therefrom a radio frequency field having at least one transverse area of substantially constant field intensity, rotating within said area the antenna which is to be tested, detecting the signal received by said antenna, amplifying selectively a narrow band of the frequency components of the detected signal, said selected band being not substantially greater than one percent of the frequency of the modulating signal, determining the magnitude of said amplified signal, and automatically recording it as a function of the instantaneous angle between said antenna and a predetermined reference point.

8. An antenna pattern measuring system comprising in combination, a variable frequency signal generator, a square wave modulator for producing a pulsating signal from said generator, a directional radiator connected to said signal generator for producing a radiation beam having therein an area of substantially uniform illumination, means for rotating the antenna to be tested in said area, and means synchronized with the rotation of said antenna for recording automatically the strength of the signal received by said antenna.

9. A model aircraft for use in determining antenna field patterns comprising a wooden body portion, a substantially continuous coating of aluminum or similar material over said body portion, an outer covering of copper over said aluminum, an antenna mounted on said aircraft, and a bolometer type detector connected to said antenna and situated within the body of said aircraft.

OTTO H. SCHMITT.
WINFIELD E. FROMM.
WESLEY A. FAILS.
FREDRIK R. BARNES.
ROGER E. AVERY.

REFERENCES CITED

The following references are of record in the file of this patent:

UNITED STATES PATENTS

| Number | Name | Date |
|---|---|---|
| 1,923,916 | Darbord | Aug. 22, 1933 |
| 1,991,474 | Taylor | Feb. 19, 1935 |
| 2,234,334 | Dziewior | Mar. 11, 1941 |
| 2,246,151 | Vrooman | June 17, 1941 |
| 2,263,377 | Busignies et al. | Nov. 18, 1941 |
| 2,269,001 | Blumlein | Jan. 6, 1942 |
| 2,279,466 | Johnske et al. | Apr. 14, 1942 |
| 2,406,406 | Sendretto et al. | Aug. 27, 1946 |
| 2,412,612 | Godet | Dec. 17, 1946 |
| 2,420,007 | Olden | May 6, 1947 |
| 2,504,334 | Iams | Apr. 18, 1950 |
| 2,548,836 | Worthington | Apr. 10, 1951 |